(12) United States Patent
Kang et al.

(10) Patent No.: US 11,127,352 B2
(45) Date of Patent: Sep. 21, 2021

(54) ELECTROSTATIC DISCHARGE PROTECTION CIRCUIT AND ORGANIC LIGHT EMITTING DISPLAY DEVICE INCLUDING THE SAME

(71) Applicant: Samsung Display Co., Ltd., Yongin-si (KR)

(72) Inventors: Ho Cheol Kang, Hwaseong-si (KR); Ha Neul Kim, Suwon-si (KR); Dae-Gwang Jang, Cheonan-si (KR); Young-Soo Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/103,530

(22) Filed: Nov. 24, 2020

(65) Prior Publication Data
US 2021/0225290 A1   Jul. 22, 2021

(30) Foreign Application Priority Data
Jan. 16, 2020   (KR) .................. 10-2020-0006039

(51) Int. Cl.
*G09G 3/3258* (2016.01)
*G09G 3/3266* (2016.01)
(Continued)

(52) U.S. Cl.
CPC ......... *G09G 3/3258* (2013.01); *G09G 3/3266* (2013.01); *G09G 3/3275* (2013.01);
(Continued)

(58) Field of Classification Search
CPC .. G09G 3/3258; G09G 3/3266; G09G 3/3275; G09G 3/3233; G09G 3/2074;
(Continued)

(56) References Cited

U.S. PATENT DOCUMENTS 7,557,590 B2 * 7/2009 Yakabe .................... H04R 3/00
                                                          324/686
2004/0252426 A1 * 12/2004 Hargrove ............ H01L 27/0255
                                                          361/56
(Continued)

FOREIGN PATENT DOCUMENTS

KR           20-0383429 Y1     5/2005

*Primary Examiner* — Nitin Patel
*Assistant Examiner* — Amen W. Bogale
(74) *Attorney, Agent, or Firm* — Lewis Roca Rothgerber Christie LLP

(57) ABSTRACT

An electrostatic discharge protection circuit including: a first electrostatic discharge diode including a cathode to receive a first voltage, and an anode connected to a sensing line; a first switching element to determine the first voltage as a precharging voltage applied to a source terminal of the driving transistor when a sensing operation is performed, and to determine the first voltage as a maximum voltage used in a display panel when the sensing operation is not performed; a second electrostatic discharge diode including a cathode connected to the sensing line, and an anode configured to receive a second voltage; and a second switching element configured to determine the second voltage as the precharging voltage when the sensing operation is performed, and to determine the second voltage as a minimum voltage used in the display panel when the sensing operation is not performed.

20 Claims, 7 Drawing Sheets

(51) Int. Cl.
*G09G 3/3275* (2016.01)
*H02H 9/04* (2006.01)

(52) U.S. Cl.
CPC ..... *H02H 9/045* (2013.01); *G09G 2300/0842* (2013.01); *G09G 2310/08* (2013.01); *G09G 2330/028* (2013.01); *G09G 2330/04* (2013.01)

(58) Field of Classification Search
CPC ........ G09G 3/006; G09G 3/0426; G09G 3/30; G09G 3/3291; G09G 3/3225; G09G 3/3208; G09G 3/3283; G09G 3/3648; G09G 2300/0809; G09G 2300/0861; G09G 2300/0819; G09G 2300/0426; G09G 2300/0866; G09G 2300/0439; G09G 2300/0814; G09G 2310/08; G09G 2310/0248; G09G 2310/0251; G09G 2310/0262; G09G 2310/0264; G09G 2310/0272; G09G 2310/027; G09G 2310/0291; G09G 2320/045; G09G 2320/043; G09G 2320/029; G09G 2320/0295; G09G 2320/0252; G09G 2320/0693; G09G 2320/0233; G09G 2320/0285; G09G 2320/02; G09G 2320/048; G09G 2320/046; G09G 2320/0276; G09G 2360/16; G09G 2330/12; G09G 2330/028; G09G 2330/08; G09G 2330/04; G09G 2330/00; G09G 2300/043; G09G 2300/08; G09G 2300/0842; H01L 27/124; H01L 27/3276; H01L 27/0248; H01L 27/0296; H01L 27/0292; H01L 27/0266; H01L 27/0255; H01L 27/1244; H01L 27/0288; H01L 23/60; G02F 1/136286; G02F 1/136204; G02F 1/1368; G02F 2201/50; G02F 2202/22; G06F 2203/04107
See application file for complete search history.

(56) References Cited

U.S. PATENT DOCUMENTS

2007/0176868 A1\* 8/2007 Lee ................. G06F 3/0412
345/87
2009/0065680 A1\* 3/2009 Okada ................ H01L 23/60
250/208.1
2020/0335024 A1\* 10/2020 Kim ..................... G09G 3/20

\* cited by examiner

ELECTROSTATIC DISCHARGE PROTECTION CIRCUIT AND ORGANIC LIGHT EMITTING DISPLAY DEVICE INCLUDING THE SAME

CROSS-REFERENCE TO RELATED APPLICATION

This application claims priority to and the benefit of Korean Patent Application No. 10-2020-0006039, filed on Jan. 16, 2020 in the Korean Intellectual Property Office (KIPO), the entire disclosure of which is incorporated herein by reference.

BACKGROUND

1. Field

Aspects of example embodiments relate generally to a display device. More particularly, aspects of example embodiments of the present disclosure relate to an electrostatic discharge protection circuit that protects a display panel from an electrostatic discharge current introduced from an outside, and an organic light emitting display device including the electrostatic discharge protection circuit.

2. Description of the Related Art

Recently, an organic light emitting display device has been widely used as a display device included in an electronic device. In general, the organic light emitting display device may be configured such that: a pixel circuit includes a driving transistor and an organic light emitting diode that are connected in series between a high power supply voltage and a low power supply voltage; and the driving transistor allows a driving current corresponding to a data signal (e.g., a data voltage) to flow to the organic light emitting diode so that the organic light emitting diode may emit light.

However, because various characteristics (e.g., a threshold voltage, electron mobility, and/or the like) of the driving transistors may be different from each other for each of pixel circuits included in the organic light emitting display device, when a characteristic deviation of the driving transistor is not compensated, light emission luminances of the pixel circuits may be different from each other (e.g., driving currents flowing through organic light emitting diodes may be different from each other), even if the same data signal is applied to the pixel circuits.

Accordingly, the organic light emitting display device may perform, on the pixel circuit, external compensation for sensing a sensing current corresponding to the characteristics of the driving transistor at each preset time point (e.g., a time point at which the organic light emitting display device is turned on or turned off, and/or the like), by generating compensation data (e.g., where a sensing voltage in an analog form is converted into the compensation data in a digital form by an analog-to-digital conversion circuit) based on the sensing voltage corresponding to the sensing current (e.g., where the sensing current is converted into the sensing voltage by a current-voltage conversion circuit (e.g., implemented as an operational amplifier, and/or the like)), and using the compensation data to compensate for the data signal supplied to the pixel circuit. In this case, the sensing current flows through a sensing line that connects the pixel circuit to a sensing driver. When an electrostatic discharge current is introduced into the pixel circuit through the sensing line, the pixel circuit (e.g., a display panel) may be damaged.

The above information disclosed in this Background section is for enhancement of understanding of the background of the present disclosure, and therefore, it may contain information that does not constitute prior art.

SUMMARY

One or more example embodiments of the present disclosure are directed to an electrostatic discharge protection circuit that may prevent or substantially prevent a noise due to voltages applied to electrostatic discharge diodes connected to a sensing line from being introduced into a sensing current when an organic light emitting display device performs a sensing operation for performing an external compensation on a pixel circuit.

One or more example embodiments of the present disclosure are directed to an organic light emitting display device including the electrostatic discharge protection circuit.

According to one or more example embodiments of the present disclosure, an electrostatic discharge protection circuit includes: a first electrostatic discharge diode including a cathode configured to receive a first voltage, and an anode connected to a sensing line through which a sensing current flows when a sensing operation for compensating for a characteristic deviation of a driving transistor of a pixel circuit is performed; a first switching element configured to determine the first voltage as a precharging voltage applied to a source terminal of the driving transistor for the sensing operation when the sensing operation is performed, and to determine the first voltage as a maximum voltage used in a display panel when the sensing operation is not performed; a second electrostatic discharge diode including a cathode connected to the sensing line, and an anode configured to receive a second voltage; and a second switching element configured to determine the second voltage as the precharging voltage when the sensing operation is performed, and to determine the second voltage as a minimum voltage used in the display panel when the sensing operation is not performed.

In an example embodiment, the first electrostatic discharge diode and the second electrostatic discharge diode may be located at the display panel.

In an example embodiment, the maximum voltage may be a first gate driving voltage corresponding to a high voltage level of a gate signal, and the minimum voltage may be a second gate driving voltage corresponding to a low voltage level of the gate signal.

In an example embodiment, in response to a voltage of the sensing line being greater than the first voltage as an electrostatic discharge current is introduced into the sensing line when the sensing operation is not performed, the first electrostatic discharge diode may be configured to discharge the electrostatic discharge current to a voltage line configured to supply the first voltage.

In an example embodiment, in response to a voltage of the sensing line being less than the second voltage as an electrostatic discharge current is introduced into the sensing line when the sensing operation is not performed, the second electrostatic discharge diode may be configured to discharge the electrostatic discharge current to a voltage line configured to supply the second voltage.

In an example embodiment, the electrostatic discharge protection circuit may further include: a third electrostatic discharge diode including a cathode configured to receive an analog high voltage, and an anode connected to the sensing line; and a fourth electrostatic discharge diode including a cathode connected to the sensing line, and an anode configured to receive an analog low voltage.

In an example embodiment, the third electrostatic discharge diode and the fourth electrostatic discharge diode may be located at a display panel driving circuit configured to drive the display panel.

In an example embodiment, in response to a voltage of the sensing line being greater than the first voltage as an electrostatic discharge current is introduced into the sensing line when the sensing operation is not performed, the third electrostatic discharge diode may be configured to discharge the electrostatic discharge current to a voltage line configured to supply the analog high voltage.

In an example embodiment, in response to a voltage of the sensing line being less than the second voltage as an electrostatic discharge current is introduced into the sensing line when the sensing operation is not performed, the fourth electrostatic discharge diode may be configured to discharge the electrostatic discharge current to a voltage line configured to supply the analog low voltage.

According to one or more example embodiments of the present disclosure, an organic light emitting display device includes: a display panel including a pixel circuit including an organic light emitting diode; a display panel driving circuit configured to drive the display panel; and an electrostatic discharge protection circuit configured to protect the display panel from an electrostatic discharge current externally introduced, the electrostatic discharge protection circuit including: a first electrostatic discharge diode including a cathode configured to receive a first voltage, and an anode connected to a sensing line through which a sensing current flows when a sensing operation for compensating for a characteristic deviation of a driving transistor of the pixel circuit is performed; a first switching element configured to determine the first voltage as a precharging voltage applied to a source terminal of the driving transistor for the sensing operation when the sensing operation is performed, and to determine the first voltage as a maximum voltage used in the display panel when the sensing operation is not performed; a second electrostatic discharge diode including a cathode connected to the sensing line, and an anode configured to receive a second voltage; and a second switching element configured to determine the second voltage as the precharging voltage when the sensing operation is performed, and to determine the second voltage as a minimum voltage used in the display panel when the sensing operation is not performed.

In an example embodiment, the pixel circuit may include: a switching transistor including a first terminal configured to receive a data signal, a second terminal connected to a first node, and a gate terminal configured to receive a gate signal; a storage capacitor including a first terminal connected to the first node and a second terminal connected to a second node; the driving transistor including a first terminal connected to a third node, a second terminal corresponding to the source terminal and connected to the second node, and a gate terminal connected to the first node; an emission control transistor including a first terminal connected to a high power supply voltage line, a second terminal connected to the third node, and a gate terminal configured to receive an emission control signal; a sensing control transistor including a first terminal connected to the second node, a second terminal connected to the sensing line, and a gate terminal configured to receive a sensing control signal; and the organic light emitting diode including an anode connected to the second node and a cathode connected to a low power supply voltage line.

In an example embodiment, the display panel driving circuit may include: a gate driver configured to provide the gate signal to the pixel circuit; a data driver configured to provide the data signal to the pixel circuit; an emission control driver configured to provide the emission control signal to the pixel circuit; a sensing driver configured to receive the sensing current from the pixel circuit to generate a sensing voltage corresponding to the sensing current, and to generate compensation data for compensating the data signal based on the sensing voltage; and a timing controller configured to control the gate driver, the data driver, the emission control driver, and the sensing driver.

In an example embodiment, the first electrostatic discharge diode and the second electrostatic discharge diode may be located at the display panel.

In an example embodiment, the maximum voltage may be a first gate driving voltage corresponding to a high voltage level of a gate signal, and the minimum voltage may be a second gate driving voltage corresponding to a low voltage level of the gate signal.

In an example embodiment, in response to a voltage of the sensing line being greater than the first voltage as the electrostatic discharge current is introduced into the sensing line when the sensing operation is not performed, the first electrostatic discharge diode may be configured to discharge the electrostatic discharge current to a voltage line configured to supply the first voltage.

In an example embodiment, in response to a voltage of the sensing line being less than the second voltage as the electrostatic discharge current is introduced into the sensing line when the sensing operation is not performed, the second electrostatic discharge diode may be configured to discharge the electrostatic discharge current to a voltage line configured to supply the second voltage.

In an example embodiment, the electrostatic discharge protection circuit may further include: a third electrostatic discharge diode including a cathode configured to receive an analog high voltage, and an anode connected to the sensing line; and a fourth electrostatic discharge diode including a cathode connected to the sensing line, and an anode configured to receive an analog low voltage.

In an example embodiment, the third electrostatic discharge diode and the fourth electrostatic discharge diode may be located at the display panel driving circuit.

In an example embodiment, in response to a voltage of the sensing line being greater than the first voltage as the electrostatic discharge current is introduced into the sensing line when the sensing operation is not performed, the third electrostatic discharge diode may be configured to discharge the electrostatic discharge current to a voltage line configured to supply the analog high voltage.

In an example embodiment, in response to a voltage of the sensing line being less than the second voltage as the electrostatic discharge current is introduced into the sensing line when the sensing operation is not performed, the fourth electrostatic discharge diode may be configured to discharge the electrostatic discharge current to a voltage line configured to supply the analog low voltage.

Accordingly, in one or more example embodiments of the present disclosure, the electrostatic discharge protection circuit may determine the first and second voltages applied to the first and second electrostatic discharge diodes connected to the sensing line as the precharging voltage when an organic light emitting display device performs the sensing operation on the pixel circuit, and may determine the first and second voltages applied to the first and second electrostatic discharge diodes connected to the sensing line as a maximum voltage and a minimum voltage used in the display panel when the organic light emitting display device does not perform the sensing operation on the pixel circuit. As a result, the electrostatic discharge protection circuit may prevent or substantially prevent a noise due to the first and second voltages applied to the first and second electrostatic discharge diodes connected to the sensing line from being introduced into a sensing current when the organic light emitting display device performs the sensing operation while preventing or substantially preventing an electrostatic discharge current from being introduced into the pixel circuit (e.g., the display panel) through the sensing line (e.g., while preventing or substantially prevented the pixel circuit (e.g., the display panel) from being damaged).

In one or more example embodiments of the present disclosure, an organic light emitting display device including the electrostatic discharge protection circuit may prevent or substantially prevent compensation data generated based on the sensing voltage corresponding to the sensing current from being inaccurate by the noise (e.g., a low-grayscale sensing error rate may be reduced) so that the external compensation may be accurately performed (e.g., a signal to noise ratio (SNR) may be increased and a deterioration compensation efficiency may be increased or maximized due to reduced compensation error) while preventing or substantially preventing the pixel circuit (e.g., the display panel) from being damaged due to introduction of the electrostatic discharge current. As a result, the organic light emitting display device may provide a high-quality image to a user (or viewer).

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
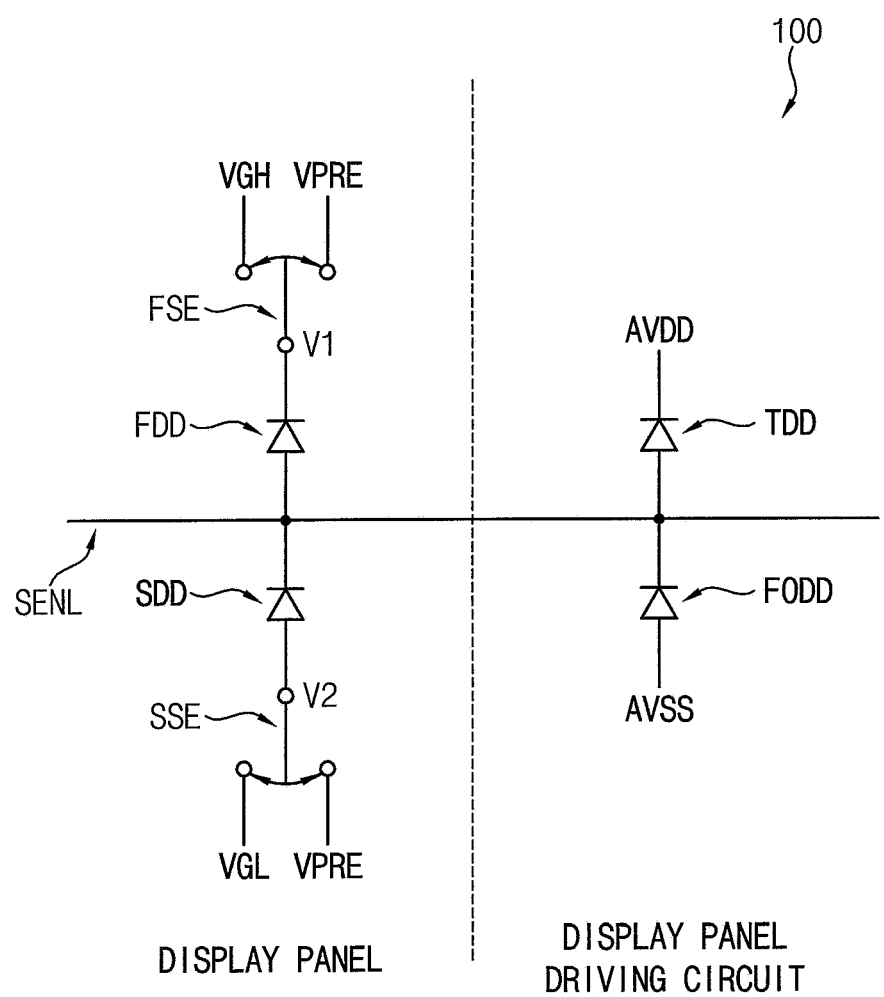
FIG. 1 is a circuit diagram illustrating an electrostatic discharge protection circuit according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
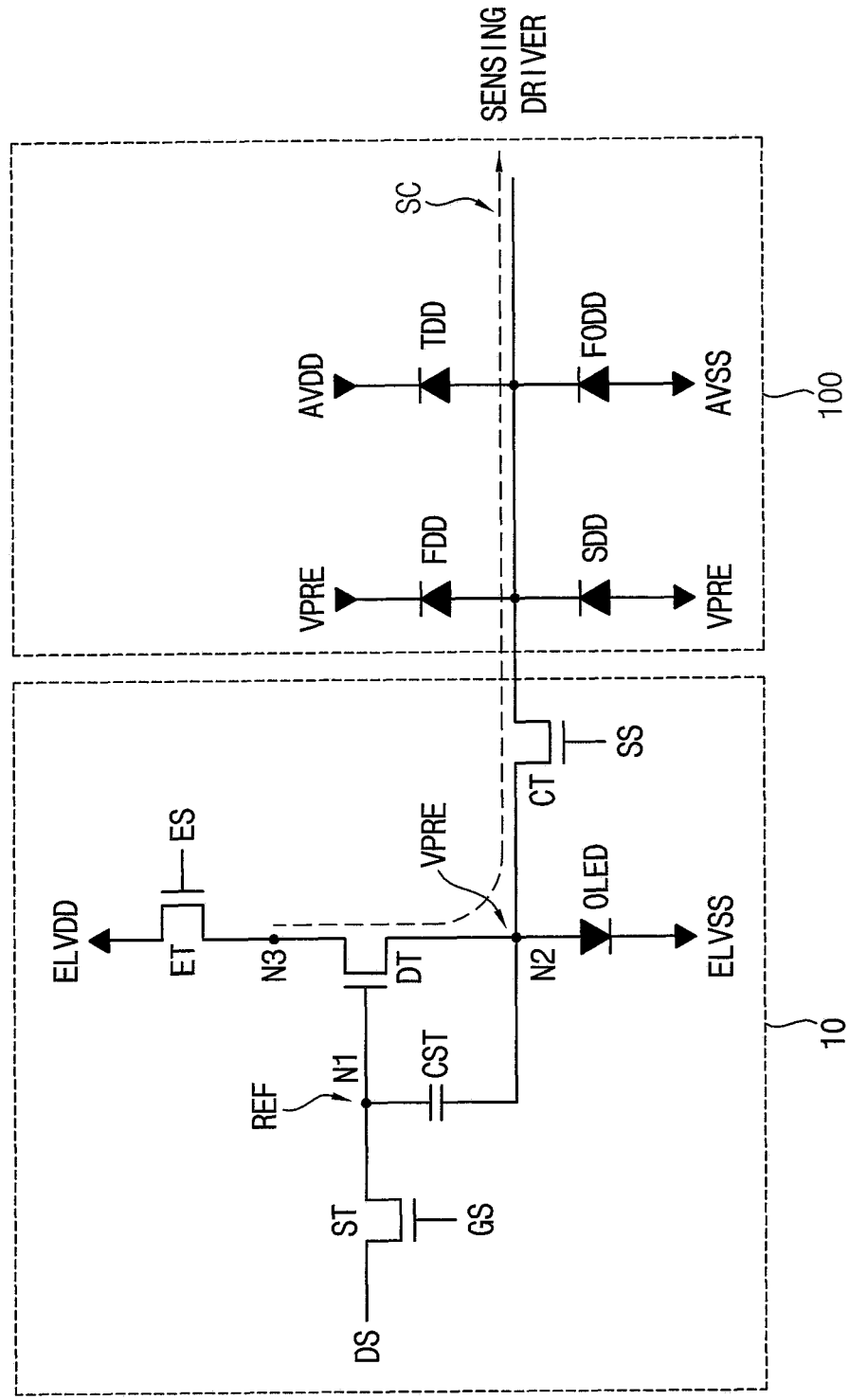
FIG. 2A is a diagram illustrating an example in which a sensing operation is performed through a sensing line connected to the electrostatic discharge protection circuit of FIG. 1.
Figure 2B:
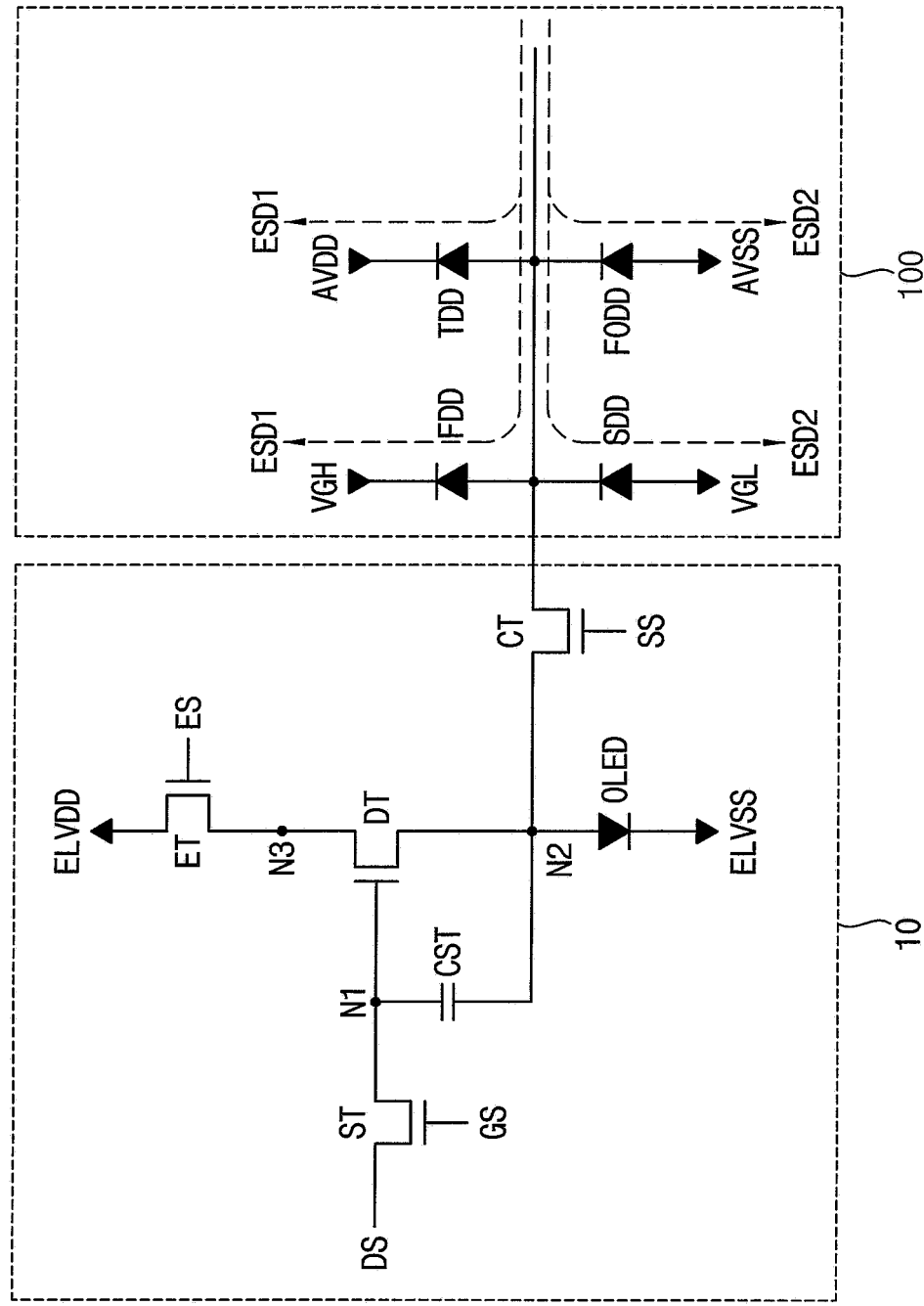
FIG. 2B is a diagram illustrating an example in which a sensing operation is not performed through a sensing line connected to the electrostatic discharge protection circuit of FIG. 1.

FIG. 1 is a circuit diagram illustrating an electrostatic discharge protection circuit according to one or more example embodiments, FIG. 2A is a diagram illustrating an example in which a sensing operation is performed through a sensing line connected to the electrostatic discharge protection circuit of FIG. 1, and FIG. 2B is a diagram illustrating an example in which a sensing operation is not performed through a sensing line connected to the electrostatic discharge protection circuit of FIG. 1.

An organic light emitting display device may include an electrostatic discharge protection circuit including electrostatic discharge diodes, each having one end connected to a sensing line, so that the display panel may be protected from the electrostatic discharge current. However, upon a sensing operation for performing the external compensation on the pixel circuit, noise may be introduced into the sensing current flowing through the sensing line due to voltages applied to opposite ends of the electrostatic discharge diodes. Accordingly, the compensation data generated based on the sensing voltage corresponding to the sensing current may become inaccurate.

An electrostatic discharge protection circuit according to one or more example embodiments of the present disclosure may prevent or substantially prevent a noise due to voltages applied to electrostatic discharge diodes connected to a sensing line from being introduced into a sensing current when an organic light emitting display device performs a sensing operation for performing an external compensation on a pixel circuit.

Referring to FIGS. 1 to 2B, an electrostatic discharge protection circuit 100 may include a first electrostatic discharge diode FDD, a first switching element (e.g., a first switch) FSE, a second electrostatic discharge diode SDD, and a second switching element (e.g., a second switch) SSE. Each of the first and second switching elements FSE and SSE may be implemented as any suitable kind of switch, for example, such as a relay, a transistor, a rectifier, a thyristor, and/or the like. In some embodiments, the electrostatic discharge protection circuit 100 may further include a third electrostatic discharge diode TDD and a fourth electrostatic discharge diode FODD.

The first electrostatic discharge diode FDD may include: a cathode configured to receive a first voltage V1; and an anode connected to a sensing line SENL through which a sensing current SC flows when a sensing operation for compensating for a characteristic deviation of a driving transistor DT included in a pixel circuit 10 is performed. The first switching element FSE may determine the first voltage V1 as a precharging voltage VPRE applied to a source terminal (e.g., a second node N2) of the driving transistor DT for the sensing operation when the sensing operation for compensating for the characteristic deviation of the driving transistor DT included in the pixel circuit 10 is performed, and may determine the first voltage V1 as a maximum voltage VGH used in a display panel when the sensing operation is not performed (e.g., a display operation, a module operation, and/or the like). In other words, the first electrostatic discharge diode FDD and the first switching element FSE may be connected in series between: the sensing line SENL; and a terminal to which the precharging voltage VPRE is applied and/or a terminal to which the maximum voltage VGH used in the display panel is applied.

As shown in FIG. 2A, when the sensing operation for compensating for the characteristic deviation of the driving transistor DT included in the pixel circuit 10 is performed, the precharging voltage VPRE applied to the source terminal (e.g., the second node N2) of the driving transistor DT may also be applied to the cathode of the first electrostatic discharge diode FDD by the first switching element FSE, so that voltages of both ends of the first electrostatic discharge diode FDD may become the same or substantially the same as each other. Accordingly, noise due to the first voltage V1 applied to the first electrostatic discharge diode FDD may be prevented or substantially prevented from being introduced into the sensing current SC.

On the other hand, as shown in FIG. 2B, when the sensing operation for compensating for the characteristic deviation of the driving transistor DT included in the pixel circuit 10 is not performed, the maximum voltage VGH used in the display panel may be applied to the cathode of the first electrostatic discharge diode FDD by the first switching element FSE, so that a voltage difference between the both ends of the first electrostatic discharge diode FDD may be large. Accordingly, when an electrostatic discharge current ESD1 is introduced into the sensing line SENL, the electrostatic discharge current ESD1 may be discharged to an outside through the first electrostatic discharge diode FDD. In an embodiment, the maximum voltage VGH used in the display panel may be a first gate driving voltage VGH corresponding to a high voltage level of a gate signal GS. However, the above configuration has been described for illustrative purposes, and the maximum voltage VGH used in the display panel is not limited thereto.

The second electrostatic discharge diode SDD may include: a cathode connected to the sensing line SENL through which the sensing current SC flows when the sensing operation for compensating for the characteristic deviation of the driving transistor DT included in the pixel circuit 10 is performed; and an anode configured to receive a second voltage V2. The second switching element SSE may determine the second voltage V2 as the precharging voltage VPRE applied to the source terminal (e.g., the second node N2) of the driving transistor DT for the sensing operation when the sensing operation for compensating for the characteristic deviation of the driving transistor DT included in the pixel circuit 10 is performed, and may determine the second voltage V2 as a minimum voltage VGL used in the display panel when the sensing operation is not performed (e.g., the display operation, the module operation, and/or the like). In other words, the second electrostatic discharge diode SDD and the second switching element SSE may be connected in series between: the sensing line SENL; and a terminal to which the precharging voltage VPRE is applied and/or a terminal to which the minimum voltage VGL used in the display panel is applied.

As shown in FIG. 2A, when the sensing operation for compensating for the characteristic deviation of the driving transistor DT included in the pixel circuit 10 is performed, the precharging voltage VPRE applied to the source terminal (e.g., the second node N2) of the driving transistor DT may also be applied to the anode of the second electrostatic discharge diode SDD by the second switching element SSE, so that voltages of both ends of the second electrostatic discharge diode SDD may become the same or substantially the same as each other. Accordingly, noise due to the second voltage V2 applied to the second electrostatic discharge diode SDD may be prevented or substantially prevented from being introduced into the sensing current SC.

On the other hand, as shown in FIG. 2B, when the sensing operation for compensating for the characteristic deviation of the driving transistor DT included in the pixel circuit 10 is not performed, the minimum voltage VGL used in the display panel may be applied to the anode of the second electrostatic discharge diode SDD by the second switching element SSE, so that a voltage difference between the both ends of the second electrostatic discharge diode SDD may be large. Accordingly, when an electrostatic discharge current ESD2 is introduced into the sensing line SENL, the electrostatic discharge current ESD2 may be discharged to the outside through the second electrostatic discharge diode SDD (e.g., in a reverse-biased direction). In an embodiment, the minimum voltage VGL used in the display panel may be a second gate driving voltage VGL corresponding to a low voltage level of the gate signal GS. However, the above configuration has been described for illustrative purposes, and the minimum voltage VGL used in the display panel is not limited thereto.

In an embodiment, as shown in FIG. 1, the first electrostatic discharge diode FDD and the second electrostatic discharge diode SDD may be located at (e.g., in or on) the display panel (e.g., indicated by "DISPLAY PANEL"). In some embodiments, the electrostatic discharge protection circuit 100 may further include a third electrostatic discharge diode TDD and a fourth electrostatic discharge diode FODD. The third electrostatic discharge diode TDD may include: a cathode configured to receive an analog high voltage AVDD; and an anode connected to the sensing line SENL through which the sensing current SC flows when the sensing operation for compensating for the characteristic deviation of the driving transistor DT included in the pixel circuit 10 is performed. In other words, the third electrostatic discharge diode TDD may be connected between the sensing line SENL and a terminal to which the analog high voltage AVDD is applied. Therefore, as shown in FIG. 2B, the analog high voltage AVDD may be applied to the cathode of the third electrostatic discharge diode TDD, so that a voltage difference between both ends of the third electrostatic discharge diode TDD may be large. Accordingly, when the electrostatic discharge current ESD1 is introduced into the sensing line SENL, the electrostatic discharge current ESD1 may be discharged to the outside through the third electrostatic discharge diode TDD.

The fourth electrostatic discharge diode FODD may include: a cathode connected to the sensing line SENL through which the sensing current SC flows when the sensing operation for compensating for the characteristic deviation of the driving transistor DT included in the pixel circuit 10 is performed; and an anode configured to receive an analog low voltage AVSS. In other words, the fourth electrostatic discharge diode FODD may be connected between the sensing line SENL and a terminal to which the analog low voltage AVSS is applied. Therefore, as shown in FIG. 2B, the analog low voltage AVSS may be applied to the anode of the fourth electrostatic discharge diode FODD, so that a voltage difference between both ends of the fourth electrostatic discharge diode FODD may be large. Accordingly, when the electrostatic discharge current ESD2 is introduced into the sensing line SENL, the electrostatic discharge current ESD2 may be discharged to the outside through the fourth electrostatic discharge diode FODD (e.g., in a reverse-biased direction). In an embodiment, as shown in FIG. 1, the third electrostatic discharge diode TDD and the fourth electrostatic discharge diode FODD may be located at (e.g., in or on) a display panel driving circuit (e.g., indicated by "DISPLAY PANEL DRIVING CIRCUIT"). In this case, the analog high voltage AVDD and the analog low voltage AVSS may be voltages used in the display panel driving circuit.

While, for convenience of description, FIGS. 2A and 2B illustrate that the pixel circuit 10 has a 4 transistor-1 capacitor (e.g., 4T-1C) structure, the present disclosure is not limited thereto. In an embodiment, the pixel circuit 10 may include a switching transistor ST, a storage capacitor CST, a driving transistor DT, an emission control transistor ET, a sensing control transistor CT, and an organic light emitting diode OLED. The switching transistor ST may include: a first terminal configured to receive a data signal DS; a second terminal connected to a first node N1; and a gate terminal configured to receive the gate signal GS. The switching transistor ST may be turned on when the gate signal GS applied to the gate terminal has a turn-on voltage level (e.g., the high voltage level) to transmit the data signal DS applied through a data line to the first node N1. The storage capacitor CST may include: a first terminal connected to the first node N1; and a second terminal connected to the second node N2. The storage capacitor CST may store the data signal DS for turning on the driving transistor DT. The driving transistor DT may include: a first terminal connected to a third node N3 and corresponding to a drain terminal; a second terminal connected to the second node N2 and corresponding to the source terminal; and a gate terminal connected to the first node N1. The driving transistor DT may allow a driving current corresponding to the data signal DS stored in the storage capacitor CST to flow to the organic light emitting diode OLED.

The emission control transistor ET may include: a first terminal connected to a high power supply voltage line configured to provide a high power supply voltage ELVDD; a second terminal connected to the third node N3; and a gate terminal configured to receive an emission control signal ES. The emission control transistor ET may be turned on when the emission control signal ES applied to the gate terminal has a turn-on voltage level (e.g., the high voltage level) to allow the driving current to flow between the high power supply voltage ELVDD and the low power supply voltage ELVSS so that the organic light emitting diode OLED may emit light. The sensing control transistor CT may include: a first terminal connected to the second node N2; a second terminal connected to the sensing line SENL; and a gate terminal configured to receive the sensing control signal SS. The sensing control transistor CT may be turned on when the sensing control signal SS applied to the gate terminal has a turn-on voltage level (e.g., the high voltage level) to apply the precharging voltage VPRE to the second node N2 corresponding to the source terminal of the driving transistor DT, and to transmit the sensing current SC, which flows through the sensing line SENL by passing through the driving transistor DT, to a sensing driver e.g., indicated by "SENSING DRIVER"). The organic light emitting diode OLED may include: an anode connected to the second node N2; and a cathode connected to a low power supply voltage line configured to provide a low power supply voltage ELVSS. However, the above configuration has been described for illustrative purposes, so that a structure of the pixel circuit 10 is not limited to the above-described structure.

In general, because various characteristics (e.g., a threshold voltage, electron mobility, and/or the like) of driving transistors DT may be different from each other for each of the pixel circuits 10, external compensation for sensing the sensing current SC corresponding to the characteristics of the driving transistor DT at each preset time point (e.g., a time point at which the organic light emitting display device is turned on or turned off, and/or the like) may be performed on the pixel circuit 10, by generating compensation data based on a sensing voltage corresponding to the sensing current SC, and compensating for the data signal DS supplied to the pixel circuit 10 by using the compensation data. In this case, the external compensation may be performed by the sensing driver. For example, the sensing driver may include: a precharging voltage application circuit configured to apply the precharging voltage VPRE to the source terminal (e.g., the second node N2) of the driving transistor DT for the sensing operation when the sensing operation for compensating for the characteristic deviation of the driving transistor DT included in the pixel circuit 10 is performed; a current-voltage conversion circuit (e.g., implemented as an operational amplifier, and/or the like) configured to convert the sensing current SC, which flows through the sensing line SENL by passing through the driving transistor DT in the pixel circuit 10, into the sensing voltage; an analog-to-digital conversion circuit configured to convert the sensing voltage in an analog form into the compensation data in a digital form; and/or the like.

When the current-voltage conversion circuit is implemented as an operational amplifier, the precharging voltage VPRE may be a reference voltage for forming a virtual ground of the current-voltage conversion circuit, that is, the operational amplifier. However, the above configuration has been described for illustrative purposes, so that the precharging voltage VPRE is not limited thereto. In more detail, as shown in FIG. 2A, the sensing operation for compensating for the characteristic deviation (e.g., a threshold voltage deviation, an electron mobility deviation, and/or the like) of the driving transistor DT included in the pixel circuit 10 may be performed through the sensing line SENL connected to the electrostatic discharge protection circuit 100. For example, when the sensing operation is performed, the precharging voltage VPRE may be applied to the source terminal (e.g., the second node N2) of the driving transistor DT in the pixel circuit 10, and a reference data voltage REF may be applied to the first node N1, so that a voltage difference between the first node N1 and the second node N2 (e.g., a gate-source voltage difference Vgs) may be determined. Therefore, when only the sensing current SC that flows through the sensing line SENL by passing through the driving transistor DT is sensed, a threshold voltage of the driving transistor DT may be determined by an expression for calculating a current flowing through the driving transistor DT: $I=K*(Vgs-Vth)^2$ (where I is the current flowing through the driving transistor DT, K is a characteristic constant of the driving transistor DT, Vgs is the gate-source voltage difference of the driving transistor DT, and Vth is the threshold voltage of the driving transistor DT). Accordingly, the organic light emitting display device may compensate for the characteristic deviation (e.g., the threshold voltage deviation, the electron mobility deviation, and/or the like) of the driving transistor DT included in the pixel circuit 10 by sensing the sensing current SC through the sensing operation.

When the electrostatic discharge currents ESD1 and ESD2 introduced into the sensing line SENL are introduced into the pixel circuit 10 (e.g., the display panel), the pixel circuit 10 (e.g., the display panel) may be damaged. For example, upon the module operation for connecting the display panel to the display panel driving circuit (e.g., configured as a chip-on-film (COF) and a printed circuit board (PCB)), there may be a possibility (e.g., a high possibility) that the electrostatic discharge currents ESD1 and ESD2 may be introduced into the pixel circuit 10 through the sensing line SENL. Accordingly, the electrostatic discharge protection circuit 100 may discharge the electrostatic discharge currents ESD1 and ESD2 introduced into the sensing line SENL to a voltage line configured to supply the first voltage V1, a voltage line configured to supply the second voltage V2, a voltage line configured to supply the analog high voltage AVDD, and/or a voltage line configured to supply the analog low voltage AVSS, so that the pixel circuit 10 (e.g., the display panel) may be protected from the electrostatic discharge currents ESD1 and ESD2.

In more detail, as shown in FIG. 2B, in the case where the sensing operation for compensating for the characteristic deviation of the driving transistor DT included in the pixel circuit 10 is not performed (e.g., the display operation, the module operation, and/or the like), when a voltage of the sensing line SENL becomes higher than the first voltage V1 (e.g., the maximum voltage VGH used in the display panel) by a preset voltage difference or more as the electrostatic discharge current ESD1 is introduced into the sensing line SENL, the first electrostatic discharge diode FDD may discharge the electrostatic discharge current ESD1 to the voltage line configured to supply the first voltage V1. In addition, when the voltage of the sensing line SENL becomes higher than the first voltage V1 (e.g., the maximum voltage VGH used in the display panel) by the preset voltage difference or more as the electrostatic discharge current ESD1 is introduced into the sensing line SENL, the third electrostatic discharge diode TDD may also discharge the electrostatic discharge current ESD1 to the voltage line configured to supply the analog high voltage AVDD.

In the case where the sensing operation for compensating for the characteristic deviation of the driving transistor DT included in the pixel circuit 10 is not performed, when the voltage of the sensing line SENL becomes lower than the second voltage V2 (e.g., the minimum voltage VGL used in the display panel) by a preset voltage difference or more as the electrostatic discharge current ESD2 is introduced into the sensing line SENL, the second electrostatic discharge diode SDD may discharge the electrostatic discharge current ESD2 to the voltage line configured to supply the second voltage V2. In addition, when the voltage of the sensing line SENL becomes lower than the second voltage V2 (e.g., the minimum voltage VGL used in the display panel) by the preset voltage difference or more as the electrostatic discharge current ESD2 is introduced into the sensing line SENL, the fourth electrostatic discharge diode FODD may also discharge the electrostatic discharge current ESD2 to the voltage line configured to supply the analog low voltage AVSS.

As a result, the electrostatic discharge protection circuit 100 may prevent or substantially prevent the electrostatic discharge currents ESD1 and ESD2 from being introduced into the pixel circuit 10 (e.g., the display panel) even if the electrostatic discharge currents ESD1 and ESD2 are introduced into the sensing line SENL, so that the pixel circuit 10 (e.g., the display panel) may be prevented or substantially prevented from being damaged by the electrostatic discharge currents ESD1 and ESD2 introduced into the sensing line SENL.

As described above, the electrostatic discharge protection circuit 100 may include: a first electrostatic discharge diode FDD including a cathode configured to receive a first voltage V1 and an anode connected to a sensing line SENL; a first switching element FSE configured to determine the first voltage V1 as a precharging voltage VPRE when a sensing operation for compensating for a characteristic deviation of a driving transistor DT included in a pixel circuit 10 is performed, and configured to determine the first voltage V1 as a maximum voltage VGH used in a display panel when the sensing operation is not performed; a second electrostatic discharge diode SDD including a cathode connected to the sensing line SENL and an anode configured to receive the second voltage V2; and a second switching element SSE configured to determine the second voltage V2 as the precharging voltage VPRE when the sensing operation for compensating for the characteristic deviation of the driving transistor DT included in the pixel circuit 10 is performed, and configured to determine the second voltage V2 as a minimum voltage VGL used in the display panel when the sensing operation is not performed. Accordingly, when the organic light emitting display device performs the sensing operation for performing the external compensation on the pixel circuit 10, the first and second voltages V1 and V2 applied to the first and second electrostatic discharge diodes FDD and SDD connected to the sensing line SENL may be determined as the precharging voltage VPRE (e.g., a voltage applied to the source terminal (e.g., the second node N2) of the driving transistor DT in the pixel circuit 10 when the organic light emitting display device performs the sensing operation for performing the external compensation on the pixel circuit 10), and when the organic light emitting display device does not perform the sensing operation for performing the external compensation on the pixel circuit 10, the first and second voltages V1 and V2 applied to the first and second electrostatic discharge diodes FDD and SDD connected to the sensing line SENL may be determined as the maximum voltage VGH and the minimum voltage VGL, respectively, that are used in the display panel.

As a result, the electrostatic discharge protection circuit 100 may prevent or substantially prevent the electrostatic discharge currents ESD1 and ESD2 from being introduced into the pixel circuit 10 (e.g., the display panel) through the sensing line SENL (e.g., may prevent or substantially prevent the pixel circuit 10 (e.g., the display panel) from being damaged), and may prevent or substantially prevent the noise due to the first and second voltages V1 and V2 that are applied to the first and second electrostatic discharge diodes FDD and SDD connected to the sensing line SENL from being introduced into the sensing current SC when the organic light emitting display device performs the sensing operation for performing the external compensation on the pixel circuit 10.

As described above, the electrostatic discharge protection circuit 100 may further include: a third electrostatic discharge diode TDD connected between an analog high voltage AVDD and the sensing line SENL; and a fourth electrostatic discharge diode FODD connected between the sensing line SENL and an analog low voltage AVSS. As shown in FIG. 1, unlike the first and second electrostatic discharge diodes FDD and SDD, each of the third electrostatic discharge diode TDD and the fourth electrostatic discharge diode FODD may not be connected to a switching element (e.g., a switch) for providing the applied voltages (e.g., the analog high voltage AVDD or the analog low voltage AVSS) thereto. However, the present disclosure is not limited thereto, and in some embodiments, similar to the first and second electrostatic discharge diodes FDD and SDD, each of the third and fourth electrostatic discharge diodes TDD and FODD may be connected to a switching element (e.g., a switch) for performing the switching of the applied voltages thereto (e.g., switching between a suitable voltage (e.g., the precharging voltage VPRE) and the analog high voltage AVDD or the analog low voltage AVSS).

Figure 3:
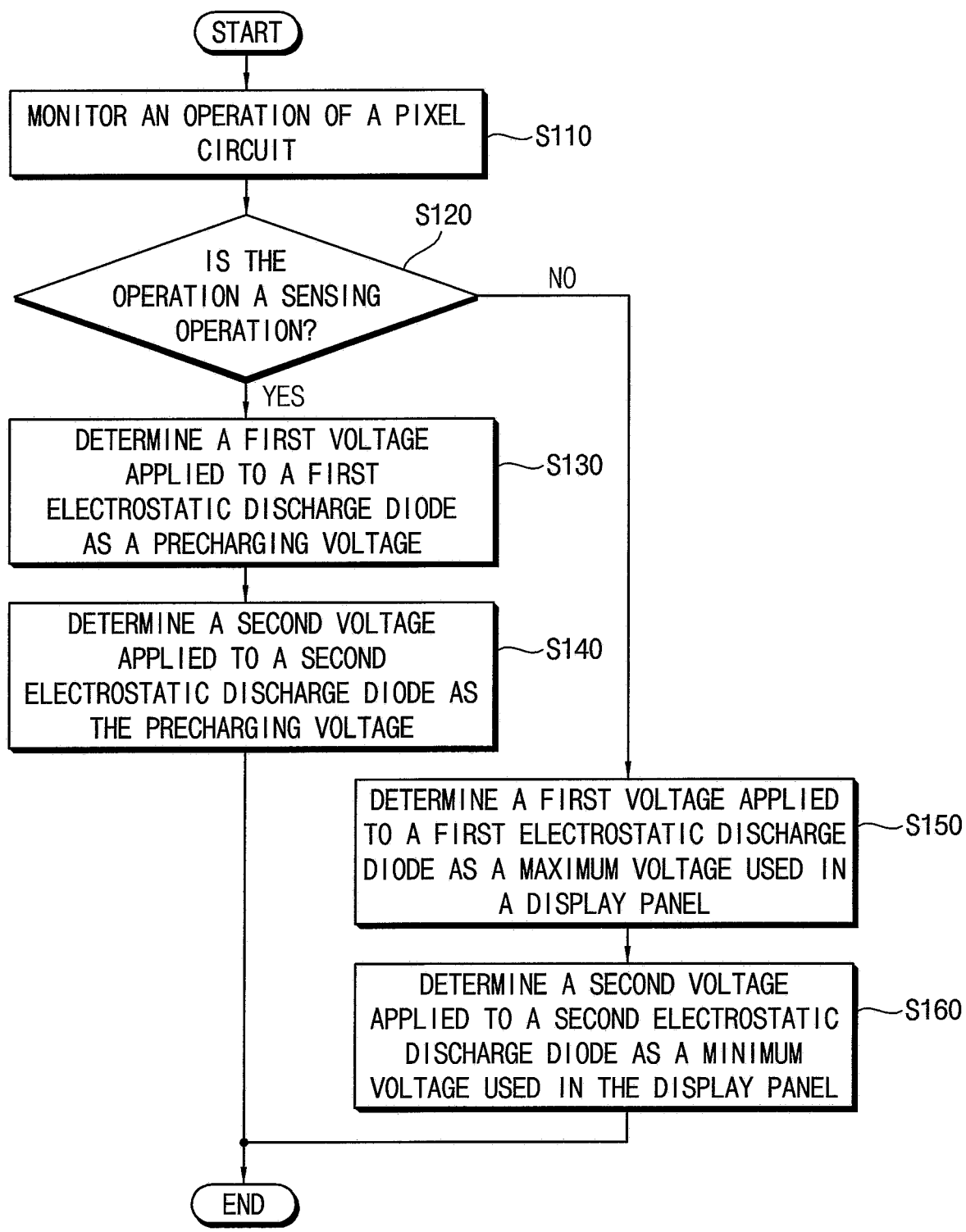
FIG. 3 is a flowchart illustrating a process in which the electrostatic discharge protection circuit of FIG. 1 determines first and second voltages applied to first and second electrostatic discharge diodes according to whether a sensing operation is performed on a pixel circuit.
Figure 4:
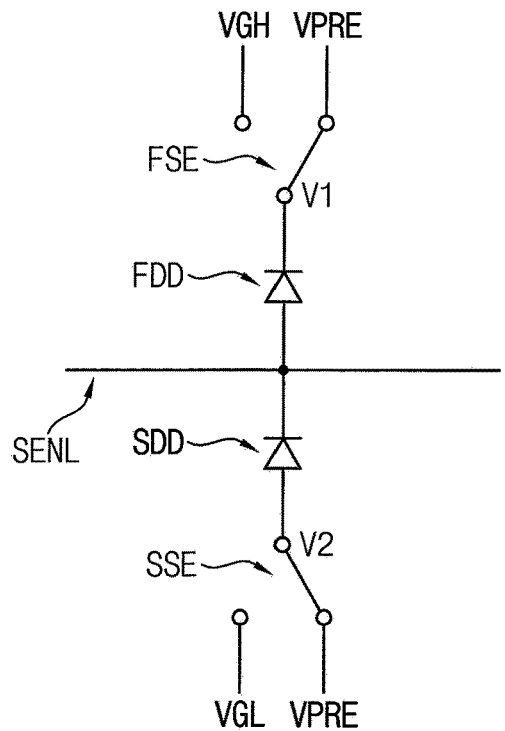
FIG. 4 is a diagram illustrating an example in which the electrostatic discharge protection circuit of FIG. 1 determines first and second voltages applied to first and second electrostatic discharge diodes when a sensing operation is performed on a pixel circuit.
Figure 5:
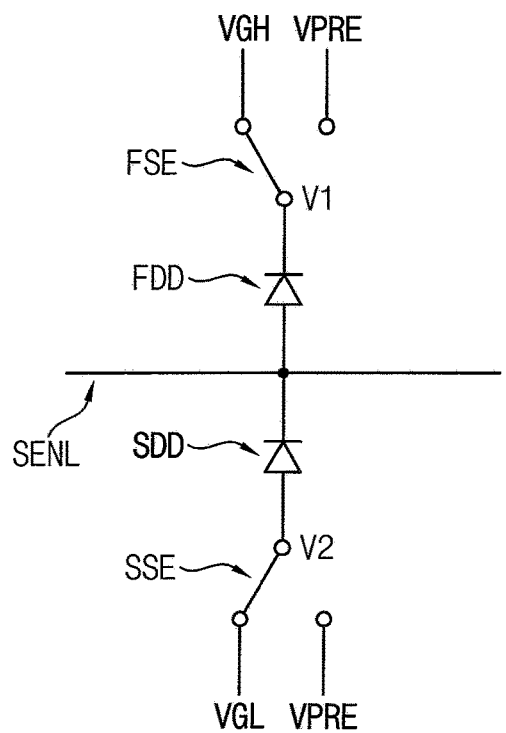
FIG. 5 is a diagram illustrating an example in which the electrostatic discharge protection circuit of FIG. 1 determines first and second voltages applied to first and second electrostatic discharge diodes when a sensing operation is not performed on a pixel circuit.

FIG. 3 is a flowchart illustrating a process in which the electrostatic discharge protection circuit of FIG. 1 determines first and second voltages applied to first and second electrostatic discharge diodes according to whether a sensing operation is performed on a pixel circuit. FIG. 4 is a diagram illustrating an example in which the electrostatic discharge protection circuit of FIG. 1 determines first and second voltages applied to first and second electrostatic discharge diodes when a sensing operation is performed on a pixel circuit. FIG. 5 is a diagram illustrating an example in which the electrostatic discharge protection circuit of FIG. 1 determines first and second voltages applied to first and second electrostatic discharge diodes when a sensing operation is not performed on a pixel circuit.

Referring to FIGS. 3 to 5, the electrostatic discharge protection circuit 100 may monitor an operation of the pixel circuit 10 (S110), and may check whether the operation of the pixel circuit 10 is the sensing operation (S120). For example, the electrostatic discharge protection circuit 100 may monitor whether the sensing control transistor CT in the pixel circuit 10 is turned on to check whether the operation of the pixel circuit 10 is the sensing operation. However, the above configuration has been described for illustrative purposes, and the electrostatic discharge protection circuit 100 may check whether the operation of the pixel circuit 10 is the sensing operation based on, for example, a suitable signal (e.g., a predetermined signal) provided from the timing controller or the like of the organic light emitting display device.

When the operation of the pixel circuit 10 is the sensing operation (e.g., YES at S120), such that the sensing operation is performed on the pixel circuit 10, as shown in FIG. 4, the electrostatic discharge protection circuit 100 may control the first switching element FSE to connect the cathode of the first electrostatic discharge diode FDD to a terminal configured to provide the precharging voltage VPRE so as to determine the first voltage V1 applied to the first electrostatic discharge diode FDD as the precharging voltage VPRE (S130), and may control the second switching element SSE to connect the anode of the second electrostatic discharge diode SDD to the terminal configured to provide the precharging voltage VPRE so as to determine the second voltage V2 applied to the second electrostatic discharge diode SDD as the precharging voltage VPRE (S140).

On the other hand, when the operation of the pixel circuit 10 is not the sensing operation (e.g., NO at S120), such that the sensing operation is not performed on the pixel circuit 10, as shown in FIG. 5, the electrostatic discharge protection circuit 100 may control the first switching element FSE to connect the cathode of the first electrostatic discharge diode FDD to a terminal configured to provide the maximum voltage VGH used in the display panel so as to determine the first voltage V1 applied to the first electrostatic discharge diode FDD as the maximum voltage VGH used in the display panel (S150), and may control the second switching element SSE to connect the anode of the second electrostatic discharge diode SDD to the terminal configured to provide the minimum voltage VGL used in the display panel so as to determine the second voltage V2 applied to the second electrostatic discharge diode SDD as the minimum voltage VGL used in the display panel (S160).

In some embodiments, when the operation of the pixel circuit 10 is not the sensing operation (e.g., such that the sensing operation is not performed on the pixel circuit 10), the electrostatic discharge protection circuit 100 may apply voltages other than the maximum voltage VGH and the minimum voltage VGL used in the display panel to the first electrostatic discharge diode FDD and the second electrostatic discharge diode SDD. For example, when the operation of the pixel circuit 10 is not the sensing operation, the electrostatic discharge protection circuit 100 may determine the first voltage V1 applied to the first electrostatic discharge diode FDD as a suitable high voltage (e.g., a predetermined high voltage) used in the display panel driving circuit (e.g., the high voltage being greater than or equal to the maximum voltage VGH used in the display panel), and may determine the second voltage V2 applied to the second electrostatic discharge diode SDD as a suitable low voltage (e.g., a predetermined low voltage) used in the display panel driving circuit (e.g., the low voltage being less than or equal to the minimum voltage VGL used in the display panel).

Figure 6:
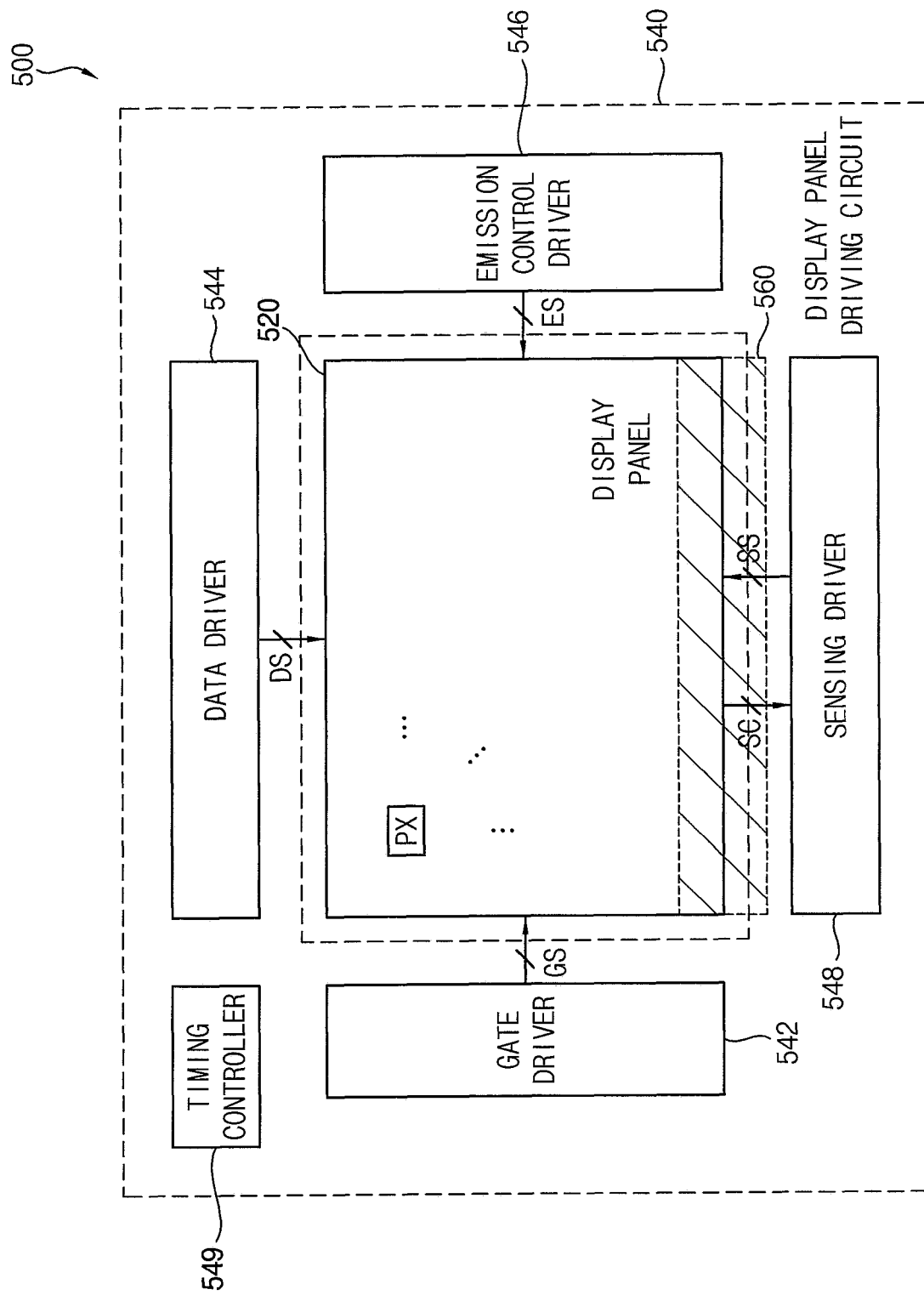
FIG. 6 is a block diagram illustrating an organic light emitting display device according to one or more example embodiments.

FIG. 6 is a block diagram illustrating an organic light emitting display device according to one or more example embodiments.

Referring to FIG. 6, an organic light emitting display device 500 may include a display panel 520, a display panel driving circuit 540, and an electrostatic discharge protection circuit 560. The display panel driving circuit 540 may include a gate driver 542, a data driver 544, an emission control driver 546, a sensing driver 548, and a timing controller 549.

The display panel 520 may include a plurality of pixel circuits PX, each of the pixel circuits PX including an organic light emitting diode. The pixel circuits PX may be arranged in various suitable shapes (e.g., in the form of a matrix) within the display panel 520. Each of the pixel circuits PX may include at least one of a red display pixel, a green display pixel, or a blue display pixel. In an embodiment, each of the pixel circuits PX may have a 4 transistor-1 capacitor (e.g., 4T-1C) structure, but the present disclosure is not limited thereto. For example, in the case of the 4T-1C structure, each of the pixel circuits PX may include: a switching transistor including a first terminal configured to receive a data signal DS, a second terminal connected to a first node, and a gate terminal configured to receive a gate signal GS; a storage capacitor including a first terminal connected to the first node and a second terminal connected to a second node; a driving transistor including a first terminal connected to a third node and corresponding to a drain terminal, a second terminal connected to the second node and corresponding to a source terminal, and a gate terminal connected to the first node; an emission control transistor including a first terminal connected to a high power supply voltage line, a second terminal connected to the third node, and a gate terminal configured to receive an emission control signal ES; a sensing control transistor including a first terminal connected to a second node, a second terminal connected to a sensing line, and a gate terminal configured to receive a sensing control signal SS; and an organic light emitting diode including an anode connected to the second node and a cathode connected to a low power supply voltage line. Because the configuration of the pixel circuit PX has been described with reference to FIGS. 2A and 2B, redundant descriptions thereof may not be repeated.

The display panel driving circuit 540 may drive the display panel 520. In an embodiment, the display panel driving circuit 540 may include the gate driver 542, the data driver 544, the emission control driver 546, the sensing driver 548, and the timing controller 549. The gate driver 542 may be electrically connected to the display panel 520 through gate lines. Accordingly, the gate driver 542 may provide the gate signal GS to the pixel circuit PX included in the display panel 520 through the gate line. The data driver 544 may be electrically connected to the display panel 520 through data lines. Accordingly, the data driver 544 may provide the data signal DS to the pixel circuit PX included in the display panel 520 through the data line. The emission control driver 546 may be electrically connected to the display panel 520 through emission control lines. Accordingly, the emission control driver 546 may provide the emission control signal ES to the pixel circuit PX included in the display panel 520 through the emission control line.

The sensing driver 548 may be electrically connected to the display panel 520 through sensing lines. Accordingly, the sensing driver 548 may receive a sensing current SC from the pixel circuit PX included in the display panel 520 through the sensing line to generate a sensing voltage corresponding to the sensing current SC, and may generate compensation data for compensating for the data signal DS based on the sensing voltage. In some embodiments, the sensing driver 548 may provide the sensing control signal SS applied to the gate terminal of the sensing control transistor in the pixel circuit PX. In an embodiment, the sensing driver 548 may include: a precharging voltage application circuit configured to apply a precharging voltage to the source terminal of the driving transistor in the pixel circuit PX for a sensing operation when the sensing operation for compensating for a characteristic deviation of the driving transistor included in the pixel circuit PX is performed; a current-voltage conversion circuit configured to convert the sensing current SC, which flows through the sensing line by passing through the driving transistor in the pixel circuit PX, into the sensing voltage; an analog-to-digital conversion circuit configured to convert the sensing voltage in an analog form into the compensation data in a digital form; and/or the like.

The timing controller 549 may control the gate driver 542, the data driver 544, the emission control driver 546, and the sensing driver 548. In addition, the timing controller 549 may compensate for the data signal DS based on the compensation data generated by the sensing driver 548.

The electrostatic discharge protection circuit 560 may be located between the display panel 520 and the display panel driving circuit 540. In more detail, the electrostatic discharge protection circuit 560 may include: a first electrostatic discharge diode including a cathode configured to receive a first voltage and an anode connected to a sensing line through which the sensing current SC flows when the sensing operation for sensing the characteristic deviation of the driving transistor included in the pixel circuit PX is performed; a first switching element configured to determine the first voltage as the precharging voltage (e.g., a voltage applied to the source terminal of the driving transistor included in the pixel circuit PX for the sensing operation) when the sensing operation for sensing the characteristic deviation of the driving transistor included in a pixel circuit PX is performed, and configured to determine the first voltage as a maximum voltage used in the display panel 520 when the sensing operation is not performed; a second electrostatic discharge diode including a cathode connected to the sensing line and an anode configured to receive the second voltage; and a second switching element configured to determine the second voltage as the precharging voltage when the sensing operation for sensing the characteristic deviation of the driving transistor included in the pixel circuit PX is performed, and configured to determine the second voltage as a minimum voltage used in the display panel 520 when the sensing operation is not performed. In this case, the maximum voltage used in the display panel 520 may be a first gate driving voltage corresponding to a high voltage level of the gate signal GS, and the minimum voltage used in the display panel 520 may be a second gate driving voltage corresponding to a low voltage level of the gate signal GS.

In some embodiments, the electrostatic discharge protection circuit 560 may further include: a third electrostatic discharge diode including a cathode configured to receive an analog high voltage, and an anode connected to the sensing line; and a fourth electrostatic discharge diode including a cathode connected to the sensing line, and an anode configured to receive an analog low voltage. In some embodiments, the first electrostatic discharge diode and the second electrostatic discharge diode may be located at (e.g., in or on) the display panel 520, and the third electrostatic discharge diode and the fourth electrostatic discharge diode may be located at (e.g., in or on) the display panel driving circuit 540.

When the organic light emitting display device 500 performs the sensing operation for performing external compensation on the pixel circuit PX, the electrostatic discharge protection circuit 560 may determine the first and second voltages applied to the first and second electrostatic discharge diodes connected to the sensing line as the precharging voltage (e.g., the voltage applied to the source terminal of the driving transistor in the pixel circuit PX when the organic light emitting display device 500 performs the sensing operation for performing the external compensation on the pixel circuit PX). When the organic light emitting display device 500 does not perform the sensing operation for performing the external compensation on the pixel circuit PX, the electrostatic discharge protection circuit 560 may determine the first and second voltages applied to the first and second electrostatic discharge diodes connected to the sensing line as the maximum voltage and the minimum voltage, respectively, used in the display panel 520.

Accordingly, an electrostatic discharge current may be prevented or substantially prevented from being introduced into the pixel circuit PX (e.g., the display panel 520) through the sensing line (e.g., the pixel circuit PX and/or the display panel 520 may be prevented or substantially prevented from being damaged), and noise due to the first and second voltages applied to the first and second electrostatic discharge diodes connected to the sensing line may be prevented or substantially prevented from being introduced into the sensing current SC when the organic light emitting display device 500 performs the sensing operation for performing the external compensation on the pixel circuit PX. As a result, the organic light emitting display device 500 including the electrostatic discharge protection circuit 560 may prevent or substantially prevent the pixel circuit PX (e.g., the display panel 520) from being damaged due to the introduction of the electrostatic discharge current, and may prevent or substantially prevent the compensation data generated based on the sensing voltage corresponding to the sensing current SC from being inaccurate by the noise due to the first and second voltages applied to the first and second electrostatic discharge diodes connected to the sensing line, so that the external compensation may be accurately performed. Accordingly, a high-quality image may be provided to a user (or a viewer).

Figure 7:
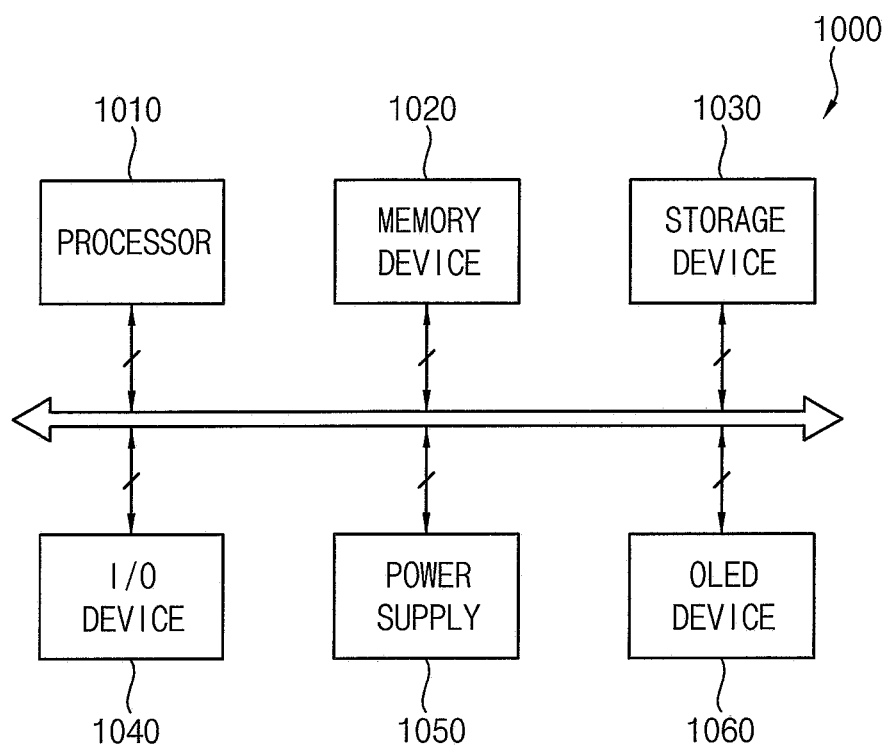
FIG. 7 is a block diagram illustrating an electronic device according to one or more example embodiments.
Figure 8:
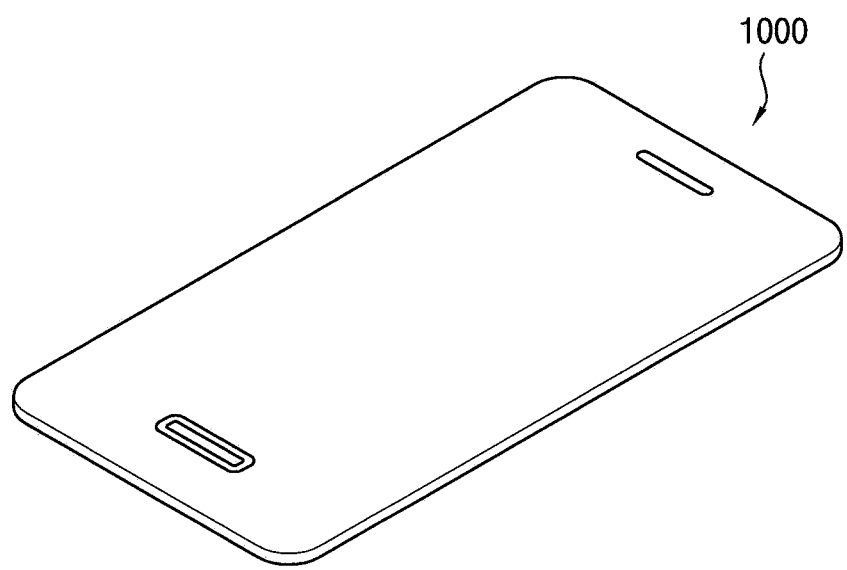
FIG. 8 is a diagram illustrating an example in which the electronic device of FIG. 7 is implemented as a smart phone.

FIG. 7 is a block diagram illustrating an electronic device according to one or more example embodiments, and FIG. 8 is a diagram illustrating an example in which the electronic device of FIG. 7 is implemented as a smart phone.

Referring to FIGS. 7 and 8, the electronic device 1000 may include a processor 1010, a memory device 1020, a storage device 1030, an input/output (I/O) device 1040, a power supply 1050, and an organic light emitting display device 1060. Here, the organic light emitting display device 1060 may be the organic light emitting display device 500 of FIG. 6. In addition, the electronic device 1000 may further include a plurality of ports for communicating with a video card, a sound card, a memory card, a universal serial bus (USB) device, other electronic devices, and/or the like. In an embodiment, as illustrated in FIG. 8, the electronic device 1000 may be implemented as a smart phone. However, the present disclosure is not limited thereto, and the electronic device 1000 may be implemented as any suitable device including or using a display device. For example, the electronic device 1000 may be implemented as a cellular phone, a video phone, a smart pad, a smart watch, a tablet PC, a car navigation system, a computer monitor, a laptop, a head mounted display (HMD) device, and/or the like.

The processor 1010 may perform various computing functions. The processor 1010 may be a microprocessor, a central processing unit (CPU), an application processor (AP), and/or the like. The processor 1010 may be coupled to other components via an address bus, a control bus, a data bus, and/or the like. Further, the processor 1010 may be coupled to an extended bus, for example, such as a peripheral component interconnection (PCI) bus.

The memory device 1020 may store data for operations of the electronic device 1000. For example, the memory device 1020 may include at least one non-volatile memory device, for example, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and/or the like, and/or may include at least one volatile memory device, for example, such as a dynamic random access memory (DRAM) device, a static random access memory (SRAM) device, a mobile DRAM device, and/or the like.

The storage device 1030 may include a solid state drive (SSD) device, a hard disk drive (HDD) device, a CD-ROM device, and/or the like. The I/O device 1040 may include an input device, for example, such as a keyboard, a keypad, a mouse device, a touch-pad, a touch-screen, and/or the like, and an output device, for example, such as a printer, a speaker, and/or the like. In some embodiments, the organic light emitting display device 1060 may be included in the I/O device 1040. The power supply 1050 may provide power for various operations of the electronic device 1000.

The organic light emitting display device 1060 may display an image corresponding to visual information of the electronic device 1000. The organic light emitting display device 1060 may be coupled to other components via the buses or other suitable communication links. The organic light emitting display device 1060 may include a display panel including a pixel circuit having an organic light emitting diode, a display panel driving circuit configured to drive the display panel (e.g., including a gate driver that provides a gate signal to the pixel circuit, a data driver that provides a data signal to the pixel circuit, an emission control driver that provides an emission control signal to the pixel circuit, a sensing driver that receives a sensing current from the pixel circuit to generate a sensing voltage corresponding to the sensing current and generates compensation data for compensating for the data signal based on the sensing voltage, and a timing controller that controls the gate driver, the data driver, the emission control driver, and the sensing driver), and an electrostatic discharge protection circuit configured to protect the display panel from an electrostatic discharge current introduced from an outside.

The electrostatic discharge protection circuit may include: a first electrostatic discharge diode including a cathode configured to receive a first voltage, and an anode connected to a sensing line through which the sensing current flows when the sensing operation is performed; a first switching element configured to determine the first voltage as a precharging voltage (e.g., a voltage applied to a source terminal of a driving transistor of the pixel circuit for the sensing operation) when the sensing operation is performed, and configured to determine the first voltage as a maximum voltage used in the display panel when the sensing operation is not performed; a second electrostatic discharge diode including a cathode connected to the sensing line, and an anode configured to receive a second voltage; and a second switching element configured to determine the second voltage as the precharging voltage when the sensing operation is performed, and configured to determine the second voltage as a minimum voltage used in the display panel when the sensing operation is not performed. The first electrostatic discharge diode and the second electrostatic discharge diode may be located at (e.g., in or on) the display panel.

In some embodiments, the electrostatic discharge protection circuit may further include: a third electrostatic discharge diode including a cathode configured to receive an analog high voltage, and an anode connected to the sensing line; and a fourth electrostatic discharge diode including a cathode connected to the sensing line, and an anode configured to receive an analog low voltage. The third electrostatic discharge diode and the fourth electrostatic discharge diode may be located at (e.g., in or on) the display panel driving circuit that drives the display panel. Because the electrostatic discharge protection circuit is described above, redundant description thereof may not be repeated.

One or more example embodiments of the present disclosure may be applied to an organic light emitting display device, and an electronic device including the organic light emitting display device. For example, one or more example embodiments of the present disclosure may be applied to a smart phone, a cellular phone, a video phone, a smart pad, a smart watch, a tablet PC, a car navigation system, a television, a computer monitor, a laptop, a head mounted display device, an MP3 player, and/or the like.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. An electrostatic discharge protection circuit comprising:
a first electrostatic discharge diode including a cathode configured to receive a first voltage, and an anode connected to a sensing line through which a sensing current flows when a sensing operation for compensating for a characteristic deviation of a driving transistor of a pixel circuit is performed;
a first switching element configured to determine the first voltage as a precharging voltage applied to a source terminal of the driving transistor for the sensing operation when the sensing operation is performed, and to determine the first voltage as a maximum voltage used in a display panel when the sensing operation is not performed;
a second electrostatic discharge diode including a cathode connected to the sensing line, and an anode configured to receive a second voltage; and
a second switching element configured to determine the second voltage as the precharging voltage when the sensing operation is performed, and to determine the second voltage as a minimum voltage used in the display panel when the sensing operation is not performed.

2. The electrostatic discharge protection circuit of claim 1, wherein the first electrostatic discharge diode and the second electrostatic discharge diode are located at the display panel.

3. The electrostatic discharge protection circuit of claim 1, wherein the maximum voltage is a first gate driving voltage corresponding to a high voltage level of a gate signal, and the minimum voltage is a second gate driving voltage corresponding to a low voltage level of the gate signal.

4. The electrostatic discharge protection circuit of claim 1, wherein, in response to a voltage of the sensing line being greater than the first voltage as an electrostatic discharge current is introduced into the sensing line when the sensing operation is not performed, the first electrostatic discharge diode is configured to discharge the electrostatic discharge current to a voltage line configured to supply the first voltage.

5. The electrostatic discharge protection circuit of claim 1, wherein, in response to a voltage of the sensing line being less than the second voltage as an electrostatic discharge current is introduced into the sensing line when the sensing operation is not performed, the second electrostatic discharge diode is configured to discharge the electrostatic discharge current to a voltage line configured to supply the second voltage.

6. The electrostatic discharge protection circuit of claim 1, further comprising:
a third electrostatic discharge diode including a cathode configured to receive an analog high voltage, and an anode connected to the sensing line; and
a fourth electrostatic discharge diode including a cathode connected to the sensing line, and an anode configured to receive an analog low voltage.

7. The electrostatic discharge protection circuit of claim 6, wherein the third electrostatic discharge diode and the fourth electrostatic discharge diode are located at a display panel driving circuit configured to drive the display panel.

8. The electrostatic discharge protection circuit of claim 6, wherein, in response to a voltage of the sensing line being greater than the first voltage as an electrostatic discharge current is introduced into the sensing line when the sensing operation is not performed, the third electrostatic discharge diode is configured to discharge the electrostatic discharge current to a voltage line configured to supply the analog high voltage.

9. The electrostatic discharge protection circuit of claim 6, wherein, in response to a voltage of the sensing line being less than the second voltage as an electrostatic discharge current is introduced into the sensing line when the sensing operation is not performed, the fourth electrostatic discharge diode is configured to discharge the electrostatic discharge current to a voltage line configured to supply the analog low voltage.

10. An organic light emitting display device comprising:
a display panel comprising a pixel circuit including an organic light emitting diode;
a display panel driving circuit configured to drive the display panel; and
an electrostatic discharge protection circuit configured to protect the display panel from an electrostatic discharge current externally introduced, the electrostatic discharge protection circuit comprising:
a first electrostatic discharge diode including a cathode configured to receive a first voltage, and an anode connected to a sensing line through which a sensing current flows when a sensing operation for compensating for a characteristic deviation of a driving transistor of the pixel circuit is performed;
a first switching element configured to determine the first voltage as a precharging voltage applied to a source terminal of the driving transistor for the sensing operation when the sensing operation is performed, and to determine the first voltage as a maximum voltage used in the display panel when the sensing operation is not performed;
a second electrostatic discharge diode including a cathode connected to the sensing line, and an anode configured to receive a second voltage; and
a second switching element configured to determine the second voltage as the precharging voltage when the sensing operation is performed, and to determine the second voltage as a minimum voltage used in the display panel when the sensing operation is not performed.

11. The organic light emitting display device of claim 10, wherein the pixel circuit comprises:
a switching transistor including a first terminal configured to receive a data signal, a second terminal connected to a first node, and a gate terminal configured to receive a gate signal;
a storage capacitor including a first terminal connected to the first node and a second terminal connected to a second node;
the driving transistor including a first terminal connected to a third node, a second terminal corresponding to the source terminal and connected to the second node, and a gate terminal connected to the first node;
an emission control transistor including a first terminal connected to a high power supply voltage line, a second terminal connected to the third node, and a gate terminal configured to receive an emission control signal;
a sensing control transistor including a first terminal connected to the second node, a second terminal connected to the sensing line, and a gate terminal configured to receive a sensing control signal; and
the organic light emitting diode including an anode connected to the second node and a cathode connected to a low power supply voltage line.

12. The organic light emitting display device of claim 11, wherein the display panel driving circuit comprises:
a gate driver configured to provide the gate signal to the pixel circuit;
a data driver configured to provide the data signal to the pixel circuit;
an emission control driver configured to provide the emission control signal to the pixel circuit;
a sensing driver configured to receive the sensing current from the pixel circuit to generate a sensing voltage corresponding to the sensing current, and to generate compensation data for compensating the data signal based on the sensing voltage; and
a timing controller configured to control the gate driver, the data driver, the emission control driver, and the sensing driver.

13. The organic light emitting display device of claim 10, wherein the first electrostatic discharge diode and the second electrostatic discharge diode are located at the display panel.

14. The organic light emitting display device of claim 10, wherein the maximum voltage is a first gate driving voltage corresponding to a high voltage level of a gate signal, and the minimum voltage is a second gate driving voltage corresponding to a low voltage level of the gate signal.

15. The organic light emitting display device of claim 10, wherein, in response to a voltage of the sensing line being greater than the first voltage as the electrostatic discharge current is introduced into the sensing line when the sensing operation is not performed, the first electrostatic discharge diode is configured to discharge the electrostatic discharge current to a voltage line configured to supply the first voltage.

16. The organic light emitting display device of claim 10, wherein, in response to a voltage of the sensing line being less than the second voltage as the electrostatic discharge current is introduced into the sensing line when the sensing operation is not performed, the second electrostatic discharge diode is configured to discharge the electrostatic discharge current to a voltage line configured to supply the second voltage.

17. The organic light emitting display device of claim 10, wherein the electrostatic discharge protection circuit further comprises:
- a third electrostatic discharge diode including a cathode configured to receive an analog high voltage, and an anode connected to the sensing line; and
- a fourth electrostatic discharge diode including a cathode connected to the sensing line, and an anode configured to receive an analog low voltage.

18. The organic light emitting display device of claim 17, wherein the third electrostatic discharge diode and the fourth electrostatic discharge diode are located at the display panel driving circuit.

19. The organic light emitting display device of claim 17, wherein, in response to a voltage of the sensing line being greater than the first voltage as the electrostatic discharge current is introduced into the sensing line when the sensing operation is not performed, the third electrostatic discharge diode is configured to discharge the electrostatic discharge current to a voltage line configured to supply the analog high voltage.

20. The organic light emitting display device of claim 17, wherein, in response to a voltage of the sensing line being less than the second voltage as the electrostatic discharge current is introduced into the sensing line when the sensing operation is not performed, the fourth electrostatic discharge diode is configured to discharge the electrostatic discharge current to a voltage line configured to supply the analog low voltage.

* * * * *